United States Patent
Raciti et al.

(10) Patent No.: US 11,476,061 B2
(45) Date of Patent: Oct. 18, 2022

(54) HYBRID SWITCHING APPARATUS OF THE WITHDRAWABLE TYPE

(71) Applicant: ABB S.p.A., Milan (IT)

(72) Inventors: Luca Raciti, Bergamo (IT); Pierangelo Bolognini, Pedrengo (IT); Luca Omati, Cavenago di Brianza (IT)

(73) Assignee: ABB S.p.A., Milan (IT)

( * ) Notice: Subject to any disclaimer, the term of this patent is extended or adjusted under 35 U.S.C. 154(b) by 0 days.

(21) Appl. No.: 17/349,983

(22) Filed: Jun. 17, 2021

(65) Prior Publication Data

US 2022/0037097 A1 Feb. 3, 2022

(30) Foreign Application Priority Data

Jul. 28, 2020 (EP) .................................... 20188245

(51) Int. Cl.
*H01H 9/54* (2006.01)
*H01H 71/12* (2006.01)

(52) U.S. Cl.
CPC ............ *H01H 9/548* (2013.01); *H01H 9/542* (2013.01); *H01H 71/123* (2013.01); *H01H 2009/544* (2013.01); *H01H 2071/124* (2013.01)

(58) Field of Classification Search
CPC .... H01H 9/548; H01H 2071/006; H01H 9/08; H01H 2009/544; H01H 2071/124; H01H 71/123; H01H 33/46; H01H 33/48; H01H 33/50; H01H 33/52; H01H 9/542; H02H 7/222; H02H 7/22; H02J 13/00036; H02J 13/0004; H02J 13/00032; H02J 13/00034; H02B 11/127; H02B 11/12; H02B 11/133; H02B 1/36; H02B 3/00; H02B 11/00

See application file for complete search history.

(56) References Cited

U.S. PATENT DOCUMENTS

| 2015/0318122 A1 | 11/2015 | Frye et al. | |
| 2017/0004948 A1* | 1/2017 | Leyh | H01H 9/548 |
| 2022/0037098 A1* | 2/2022 | Degli Innocenti | H01H 9/548 |
| 2022/0037917 A1* | 2/2022 | Degli Innocenti | H01H 9/08 |
| 2022/0037919 A1* | 2/2022 | Degli Innocenti | H01H 9/08 |

FOREIGN PATENT DOCUMENTS

| EP | 3336872 A1 | 6/2018 | |
| FR | 2883676 A1 * | 9/2006 | H02B 11/12 |

OTHER PUBLICATIONS

European Patent Office, Extended Search Report issued in corresponding Application No. 20188245.3, dated Dec. 9, 2020, 7 pp.

* cited by examiner

*Primary Examiner* — Jared Fureman
*Assistant Examiner* — Nicolas Bellido
(74) *Attorney, Agent, or Firm* — Armstrong Teasdale LLP

(57) ABSTRACT

A switching apparatus for electric power distribution grids including: a withdrawable first switching unit having one or more first electric poles; a withdrawable second switching unit having one or more second electric poles and electrically connected ins series with said first switching unit; and a controller implementing control strategies directed to increase the safety of the withdrawal manoeuvres of said first and second switching units.

19 Claims, 6 Drawing Sheets

HYBRID SWITCHING APPARATUS OF THE WITHDRAWABLE TYPE

BACKGROUND

The present invention relates to a switching apparatus for electric power distribution grids, such as a circuit breaker or another apparatus of similar type.

As it is known, low voltage switching apparatuses are used in electric circuits or grids to allow the correct operation of specific circuit or grid sections. For instance, these apparatuses may be used to ensure the availability of a nominal current necessary for several utilities, enable the proper insertion and disconnection of electric loads and protect (especially circuit breakers) the electric grid and installed electric loads against fault events, such as overloads and short circuits.

Most traditional switching apparatuses include an electro-mechanical switching unit having one or more electric poles, each comprising a pair of electric contacts adapted to be coupled or uncoupled to allow or interrupt line currents along the electric poles.

Although they have proven to be very robust and reliable, second switching apparatuses show a relatively long interruption time in DC applications, mainly at relatively high voltages (between 1-1.5 kV DC). As a consequence, electric arcs, which usually strike between electric contacts under separation, may last for a relatively long time. This may cause severe wear phenomena of the electric contacts and a consequent remarkable reduction of the operating reliability and electrical endurance.

In order to overcome these technical issues, they have been designed switching apparatuses (also referred to as "SSCBs"—Solid-State Circuit Breakers) including a switching unit having, for each electric pole, one or more solid-state switches, i.e. semiconductor-based transistors or thyristors adapted to operate in a conduction state or in an interdiction state to allow or interrupt a current flow.

The main advantage of SSCBs consists in that they have a potentially unlimited electrical endurance due to the circumstance that breaking operations are carried out without the formation of electric arcs. Further, their interruption time is remarkably shorter in comparison with the interruption time of switching apparatuses of the electro-mechanical type.

An important drawback of SSCBs consists in that they cannot generally provide galvanic insulation between the line conductors connected thereto. In fact, when a voltage is applied to the power terminals of solid-state switches (e.g. the collector and emitter terminals of an IGBT), leakage currents typically flow even if said switches are in an interdiction state.

Recently, they have been developed switching apparatuses including a SSCB switching unit and an electro-mechanical switching unit electrically connected in series.

These switching apparatuses (generally referred to as "hybrid switching apparatuses") allow exploiting all the advantages provided by SSCBs in terms of reliability and reduction of the interruption time and, at the same time, they allow obtaining galvanic insulation between the line conductors connected thereto.

As it is known, many hybrid switching apparatuses are of the "withdrawable" type. In this case, both the SSCB and the second switching units are movable with respect to a fixed section of the switching apparatus. In particular, each switching unit is mounted on a carriage in such a way to be reversibly movable between an insertion position and a withdrawn position with respect to the fixed section of the switching apparatus.

Hybrid switching apparatuses of the withdrawable type have further advantages in terms of efficiency of use and safety. In fact, both the above-mentioned switching units may be brought in a withdrawn position for easily carrying out on-the-field tests or maintenance interventions with the switching units completely disconnected from the line conductors.

However, also these switching apparatuses have some aspects to improve, particularly for what concerning the coordinated control of the SSCB switching unit and the electro-mechanical switching unit in operation.

Currently adopted control strategies do not allow these switching apparatuses to operate in a completely safe way in some circumstances, for example when they cannot receive an external auxiliary power supply to feed their internal low-voltage components, e.g. electronic circuits, actuators or controllers.

SUMMARY

The main aim of the present invention is providing a hybrid switching apparatus of the withdrawable type, which makes it possible to overcome or mitigate the aforementioned technical issues of the state of the art.

Within this aim, an object of the present invention is providing a switching apparatus, which ensures high levels of safety and efficiency in operation.

Another object of the present invention is providing a switching apparatus, which can be easily controlled in operation without arranging complex and expensive control resources.

Another object of the present invention is providing a switching apparatus relatively easy and cheap to manufacture at industrial level.

This aim and these objects, together with other objects that will become evident from the following description and accompanying drawings, are achieved, according to the present invention, by a switching apparatus, according to claim 1 and the related dependent claims set out below.

The switching apparatus, according to the invention, comprises:
one or more first and second line terminals intended to be electrically connected to corresponding first and second line conductors of an electric line, respectively;
a first switching unit having one or more first electric poles, each first electric pole comprising a first pole contact) intended to be electrically connected to a corresponding first line terminal, a second pole contact) and one or more solid-state switches electrically connected to said first and second pole contacts and adapted to operate in a conduction state or in an interdiction state to allow or interrupt a current flow.
Said first switching unit is reversibly switchable between a closed condition, in which said solid-state switches are in a conduction state, and an open condition, in which said solid-state switches are in an interdiction state.
Said first switching unit is reversibly movable between an insertion condition, in which said first pole contacts are coupled with said first line terminals, and a withdrawal condition, in which said first pole contacts are uncoupled from said first line terminals;
a second switching unit having one or more second electric poles, each second electric pole comprising a third pole contact intended to be electrically connected to a corresponding second pole contact of the first switching unit, a fourth pole contact intended to be electrically connected to a corresponding second line terminal and electric contacts electrically connected to said third and fourth pole contacts and adapted to operate in a coupled state or on an uncoupled state to allow or interrupt a current flow.

Said second switching unit is reversibly switchable between a closed condition, in which said electric contacts are in a coupled state, and an open condition, in which said electric contacts are in an uncoupled state.

Said second switching unit is reversibly movable between an insertion condition, in which said fourth pole contacts are coupled with said second line terminals, and a withdrawal condition, in which said fourth pole contacts are uncoupled from said second line terminals.

According to the invention, the controller of the switching apparatus is configured to control said first and second switching units, so that both said first and second switching units are in an open condition, when said power supply stage is subject to a fault condition.

Preferably, said controller is configured to command said first switching unit and said second switching unit to switch to or remain in an open condition, in response to receiving sensing signals indicative of a fault condition of said power supply stage.

Preferably, the switching apparatus comprises power supply sensing means adapted to provide sensing signals indicative of the operating conditions of said power supply stage (4) to said controller.

According to an aspect of the invention, the controller of the switching apparatus is configured to control the operating conditions of said first and second switching units, so that said first and second switching units operate in combination according to the following operating configurations:
- a first operating configuration corresponding to a closed state of said switching apparatus, in which both said first and second switching units are in a closed condition; or
- a second operating configuration corresponding to a stand-by state of said switching apparatus, in which said first switching unit is in an open condition and said second switching unit is in a closed condition; or
- a third operating configuration corresponding to an open state of said switching apparatus, in which both said first and second switching units are in an open condition.

Said controller is configured to control said first and second switching units, so that said first and second switching units are in said third operating configuration, when said power supply stage is subject to a fault condition.

Preferably, said controller is configured to command said first switching unit and said second switching unit to switch to or remain in said third operating configuration, in response to receiving sensing signals indicative of a fault condition of said power supply stage.

Preferably, when said first and second switching units operate in combination according to said first operating configuration, said controller commands said first and second switching units to switch to said second operating configuration and subsequently to switch to said third operating configuration in response to receiving sensing signals indicative of a fault condition of said power supply stage.

Preferably, when said first and second switching units operate in combination according to said second operating configuration, said controller commands said first and second switching units to switch to said third operating configuration in response to receiving sensing signals indicative of a fault condition of said power supply stage.

Preferably, when said first and second switching units operate in combination according to said third operating configuration, said controller commands said first and second switching units to remain in said third operating configuration in response to receiving sensing signals indicative of a fault condition of said power supply stage.

According to an aspect of the invention, the switching apparatus comprises a first actuating arrangement adapted to actuate said first switching unit at least during a withdrawal manoeuvre of said first switching unit, upon activation by a user.

According to an aspect of the invention, the switching apparatus comprises a second actuating arrangement (8) adapted to actuate said second switching unit at least during a withdrawal manoeuvre of said second switching unit, upon activation by a user.

According to an aspect of the invention, the controller of the switching apparatus comprises an interface section including one or more input ports adapted to receive input commands indicative of a desired operating state for said switching apparatus.

Preferably, the switching apparatus comprises a human-machine interface in communication with said interface section. Said human-interface is adapted to provide said input commands upon an interaction with a user.

Preferably, said interface section is capable of receiving said input commands from a remote computerized device.

According to an aspect of the invention, the controller of the switching apparatus is included in said first switching unit.

BRIEF DESCRIPTION OF THE FIGURES

Further characteristics and advantages of the present invention shall emerge more clearly from the description of preferred but not exclusive embodiments illustrated purely by way of examples and without limitation in the attached drawings, in which.

DETAILED DESCRIPTION

Figure 1:
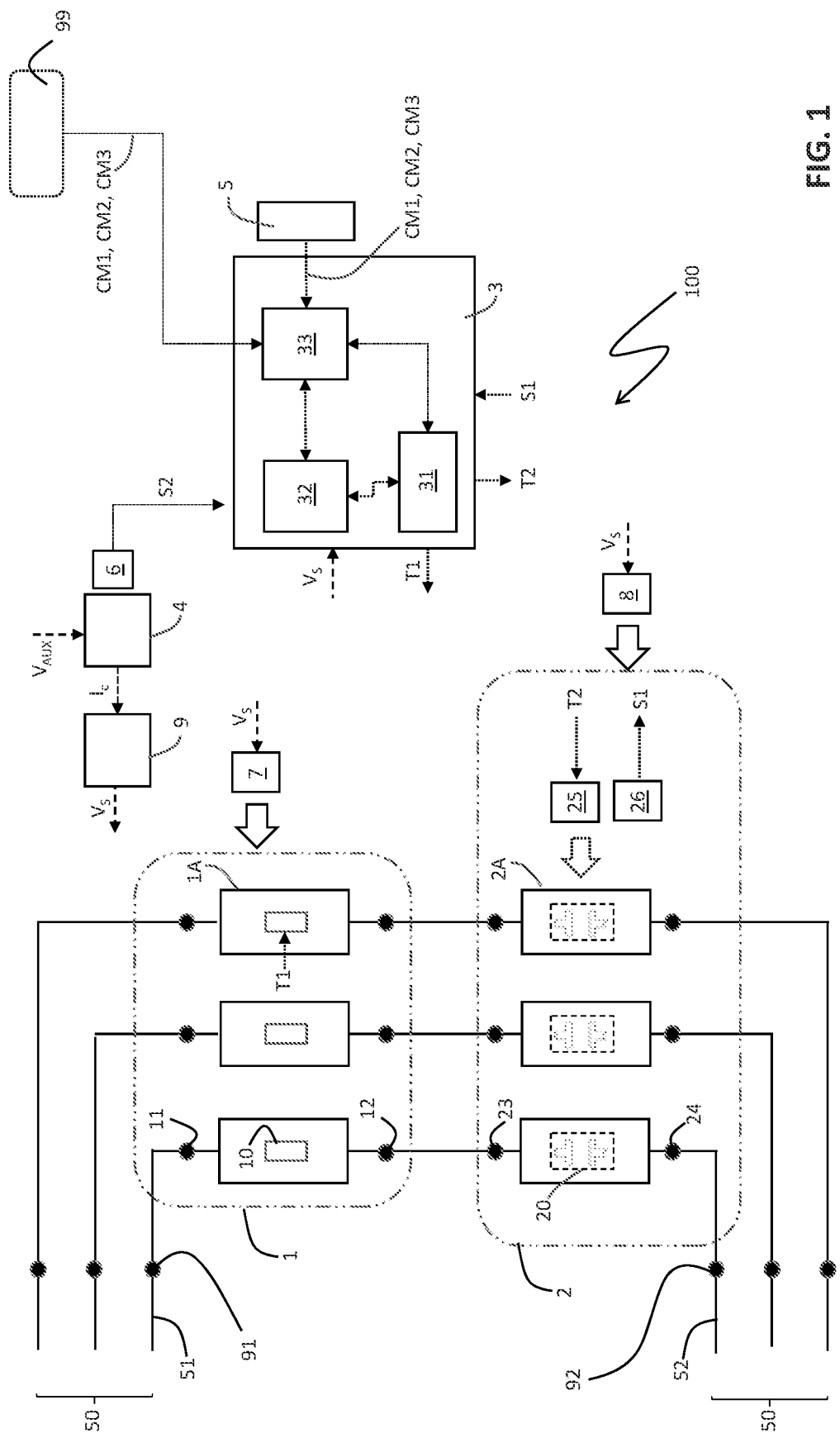
FIG. 1 schematically shows the switching apparatus, according to the invention.

With reference to the mentioned figures, the present invention relates to a switching apparatus 100 for electric power distribution grids, such as a circuit breaker, a disconnector, a contactor, or the like.

The switching apparatus 100 is particularly adapted for installation in low voltage electric grids or systems. However, it may be successfully employed also in medium voltage electric grids or systems.

For the purposes of the present invention, the term "low voltage" (LV) relates to operating voltages lower than 1 kV AC and 1.5 kV DC while the term "medium voltage" (MV) relates to higher operating voltages up to some tens of kV, e.g. up to 72 kV AC and 100 kV DC.

In general, the switching apparatus 100 is intended to be electrically connected to an electric line 50. Typically, the electric line 50 comprises one or more first line conductors 51, which may be electrically connected to an equivalent electric power source (e.g. an electric power feeding or generation system or a section of electric grid), and one or more second line conductors 52, which may be connected to an equivalent electric load (e.g. an electric system or apparatus or a section of electric grid).

In the embodiment shown in the cited figures, the electric line 50 is of the three-phase type. However, in principle, it may include a different number of electric phases.

The switching apparatus 100 comprises one or more first and second line terminals 91, 92 intended to be electrically connected to corresponding first and second line conductors 51, 52 of the electric line 50, respectively.

Conveniently, the first and second line terminals 91, 92 are accommodated in a fixed section (not shown) of the switching apparatus, which is conveniently defined by a supporting frame (not shown) of the switching apparatus.

The switching apparatus 100 comprises a first switching unit 1 of the SSCB type and a second switching unit 2 of the electro-mechanical type, which in operation are electrically connected in series between the above-mentioned line terminals 91, 92.

The first switching unit 1 comprises one or more first electric poles 1A.

The number of electric poles of the first switching unit may vary, according to the needs. In the embodiment shown in the cited figures, the first switching unit is of the three-phase type and it comprises three-electric poles. However, according to other embodiments of the invention (not shown), the first switching unit may include a different number of electric poles.

Each electric pole 1A is intended to be electrically connected to a corresponding first line conductor 51 of the electric line 50 and with a corresponding electric pole of the second switching unit 2.

Each electric pole 1A comprises a first pole contact 11 intended to be electrically connected to a corresponding first line terminal 91 of the switching apparatus and a second pole contact 12 intended to be electrically connected to a corresponding pole contact 23 of the second switching unit 2.

Each electric pole 1A comprises one or more solid-state switches 10 adapted to operate in a conduction state or in an interdiction state to allow or interrupt a current flow.

Solid-state switches ("SSCBs) 10 may include, for example, MOSFETs, Insulated Gate Bipolar Transistors ("IGBTs"), Gate Turn-Off Thyristors (GTOs), Integrated Gate-Commutated Thyristors ("IGCTs"), or the like.

The solid-state switches 10 of each electric pole 1A are electrically connected between the pole contacts 11 and 12, for example according to a series configuration or other more complex circuit configurations of known type.

In operation, the first switching unit 1 is capable of reversibly switching between a closed condition ON, in which the solid-state switches 10 of the electric poles 1A are in a conduction state, and an open condition OFF, in which the solid-state switches 10 of the electric poles 1A are in an interdiction state.

When the first switching unit 1 is in a closed condition ON, line currents are allowed to flow along the electric poles 1A. Instead, when the switching unit 1 is in an open condition OFF, no line currents can flow along the electric poles 1A. However, possible leakage currents, which typically affect solid-state switches in an interdiction state, may still circulate.

A transition from a closed condition ON to an open condition OFF forms an opening manoeuvre of the first switching unit whereas a transition from an open condition OFF to a closed condition ON forms a closing manoeuvre of the first switching unit.

The first switching unit 1 may carry out an opening manoeuvre or a closing manoeuvre upon receiving first trip signals T1 from a controller 3.

Preferably, the first switching unit 1 includes one or more first driving circuits (not shown) adapted to receive the first trip signals T1 and drive the control terminals (e.g. gate terminals or base terminals) of the solid-state switches 10 depending on said first trip signals.

The second switching unit 2 comprises one or more second electric poles 2A.

Also in this case, the number of electric poles 2A of the switching unit 2 may vary, according to the needs. In general, the number of electric poles 2A corresponds to the number of the electric poles 1A of the first switching unit 1.

Each electric pole 2A is electrically connected in series with a corresponding electric pole 1A of the first switching unit 1 and it is intended to be electrically connected to a corresponding second line conductor 52 of the electric line 50.

Each electric pole 2A thus comprises a third pole contact 23 intended to be electrically connected to a corresponding second pole contact 12 of the first switching unit 1 and a fourth pole contact 24 intended to be electrically connected with a second line terminal 92 of the switching apparatus.

Each second electric pole 2A comprises electric contacts 20 that can operate in a coupled state or on an uncoupled state to allow or interrupt a current flow. Conveniently, the electrical contacts 20 of each electric pole 2A comprise a fixed electric contact and a movable electric contact (not shown). Each movable contact can be actuated to couple with or uncouple from the fixed contact.

In operation, the second switching unit 2 is capable of reversibly switching between a closed condition ON, in which the electric contacts 20 of the electric poles 2A are in a coupled state, and an open condition OFF, in which the electric contacts 20 of the electric poles 2A are in an uncoupled state.

When the second switching unit 2 is in a closed condition ON, line currents are allowed to flow along the electric poles 2A. Instead, when the second switching unit 2 is in an open condition OFF, no line currents can flow along the electric poles 2A.

A transition from a closed condition ON to an open condition OFF forms an opening manoeuvre of the second switching unit whereas a transition from an open condition OFF to a closed condition ON forms a closing manoeuvre of the second switching unit.

Preferably, the second switching unit 2 comprises one or more trip actuators 25 (which may be of known type) adapted to cause the actuation of the movable contacts of said switching unit in order to carry out the above-mentioned opening and closing manoeuvres.

As an example, the trip actuators 25 may include an opening coil actuator adapted to cause the actuation of the movable contacts of the electric poles 2A to carry out an opening manoeuvre and a closing coil actuator adapted to cause the actuation of the movable contacts of the electric poles 2A to carry out a closing manoeuvre.

The trip actuators 25 are operatively coupleable with a suitable actuation mechanism (not shown) adapted to actuate the movable contacts of the second switching unit. Such an actuation mechanism (which may be of known type) is conveniently designed to move the movable contacts of the second switching unit 2 upon tripping by the above-mentioned trip actuators.

The second switching unit 2 may carry out an opening manoeuvre or a closing manoeuvre upon receiving trip signals T2 from a controller.

Preferably, the second switching unit 2 may include one or more second driving circuits (not shown) adapted to receive the above-mentioned trip signals T2 and drive the trip actuators 25 depending on said second trip signals.

When driven according to the trip signals T2, the trip actuators 25 trip the above-mentioned actuation mechanism, which actuates the movable contacts of the second switching unit to carry out a closing manoeuvre or an opening manoeuvre of this latter.

Preferably, the second switching unit 2 comprises one or more contact sensing means 26 adapted to provide sensing signals S1 indicative of the operating conditions of the second switching unit 2 to a controller.

As an example, the sensing means 26 may comprise a closing micro-switch (which may be of the known type) adapted to signal a closed condition ON of the switching unit 2 and an opening micro-switch (which may be of the known type) adapted to signal an open condition OFF of the switching unit 2.

According to the invention, the switching apparatus 100 is of the withdrawable type.

Both the first and the second switching units 1, 2 can thus be withdrawn from their normal operating position so as to be disconnected from the electric line 50.

The first switching unit 1 is reversibly movable between an insertion condition A, in which the first pole contacts 11 are coupled with the first line terminals 91, and a withdrawal condition B, in which the first pole contacts 11 are uncoupled from the first line terminals 91.

Preferably, when it is in an insertion condition A, the first switching unit 1 has the second pole contacts 12 coupled with the third pole contacts 23 of the second switching unit 2.

Preferably, when it is in a withdrawal condition B, the first switching unit 1 has the second pole contacts 12 uncoupled from the third pole contacts 23 of the second switching unit 2.

A transition from an insertion condition A to a withdrawal condition B forms a withdrawal manoeuvre of the first switching unit whereas a transition from a withdrawal condition B to an insertion condition A forms an insertion manoeuvre of the first switching unit.

When it is in a withdrawal condition B, the first switching unit 1 may be in a test position, in which it is electrically disconnected from the electric line 50 but it is still electrically connected to a power supply stage of the switching apparatus and it has its low-voltage components fed by this latter, or in a full withdrawn position, in which it is electrically disconnected from any electric circuit.

Preferably, the switching apparatus 100 comprises a first carriage (not shown), on which the first switching unit 1 is mounted. Conveniently, such a first carriage is slidingly coupled to a supporting frame of the switching apparatus 100. In this way, both the first switching unit 1 and the first carriage are movable with respect to the fixed section of the switching apparatus.

The switching apparatus 100 comprises a first actuating arrangement 7 (which may be of known type) adapted to actuate the first switching unit 1, upon activation by a user (e.g. through a suitable command button), in order to carry out at least a withdrawal manoeuvre of said switching unit.

According to preferred embodiments of the invention, the first actuating arrangement 7 is adapted to move the first switching unit 1, upon activation by a user (e.g. through a suitable command button), also during an insertion manoeuvre of this latter.

According to other embodiments of the invention, the insertion manoeuvre of the switching unit 1 may be carried out directly by a user, e.g. by using a mechanical tool operatively couplable with suitable kinematic chains operatively coupled to the switching unit 1 and the supporting frame of the switching apparatus.

As for the first switching unit 1, the second switching unit 2 is reversibly movable between an insertion condition A, in which the fourth pole contacts 24 are coupled with the second line terminals 92 and a withdrawal condition B, in which the fourth pole contacts 24 are uncoupled from the second line terminals 92.

Preferably, when it is in an insertion condition A, the second switching unit 2 has the third pole contacts 23 coupled with the second pole contacts 12 of the first switching unit 1.

Preferably, when it is in a withdrawal condition B, the second switching unit 2 has the third pole contacts 23 uncoupled from the second pole contacts 12 of the first switching unit 1.

A transition from an insertion condition A to a withdrawal condition B forms a withdrawal manoeuvre of the switching unit 2 whereas a transition from a withdrawal condition B to an insertion condition B forms an insertion manoeuvre of the switching unit 2.

When it is in a withdrawal condition B, the switching unit 2 may be in a test position, in which it is electrically disconnected from the electric line 50 but it is still electrically connected to a power supply stage of the switching apparatus and it has its low-voltage components fed by this latter, or in a fully withdrawn position, in which it is electrically disconnected from any electric circuit.

Preferably, the switching apparatus 100 comprises a second carriage (not shown), on which the switching unit 2 is mounted. Conveniently, such a second carriage is slidingly coupled to the supporting frame of the switching apparatus 100 thereby being movable (together with the second switching unit 2) with respect to the fixed section of this latter.

The switching apparatus 100 comprises a second actuating arrangement 8 (which may be of known type) adapted to actuate the second switching unit 2, upon activation by a user (e.g. through a suitable command button), at least during a withdrawal manoeuvre of this latter.

According to some embodiments of the invention, the second actuating arrangement 8 is adapted to move the second switching unit 2, upon activation by a user (e.g. through a suitable command button), also during an insertion manoeuvre of this latter.

According to some embodiments of the invention, the insertion manoeuvre of the switching unit 2 may be carried out directly by a user, e.g. by using a mechanical tool operatively couplable with suitable kinematic chains operatively coupled to the switching unit 1 and the supporting frame of the switching apparatus.

Figure 2:
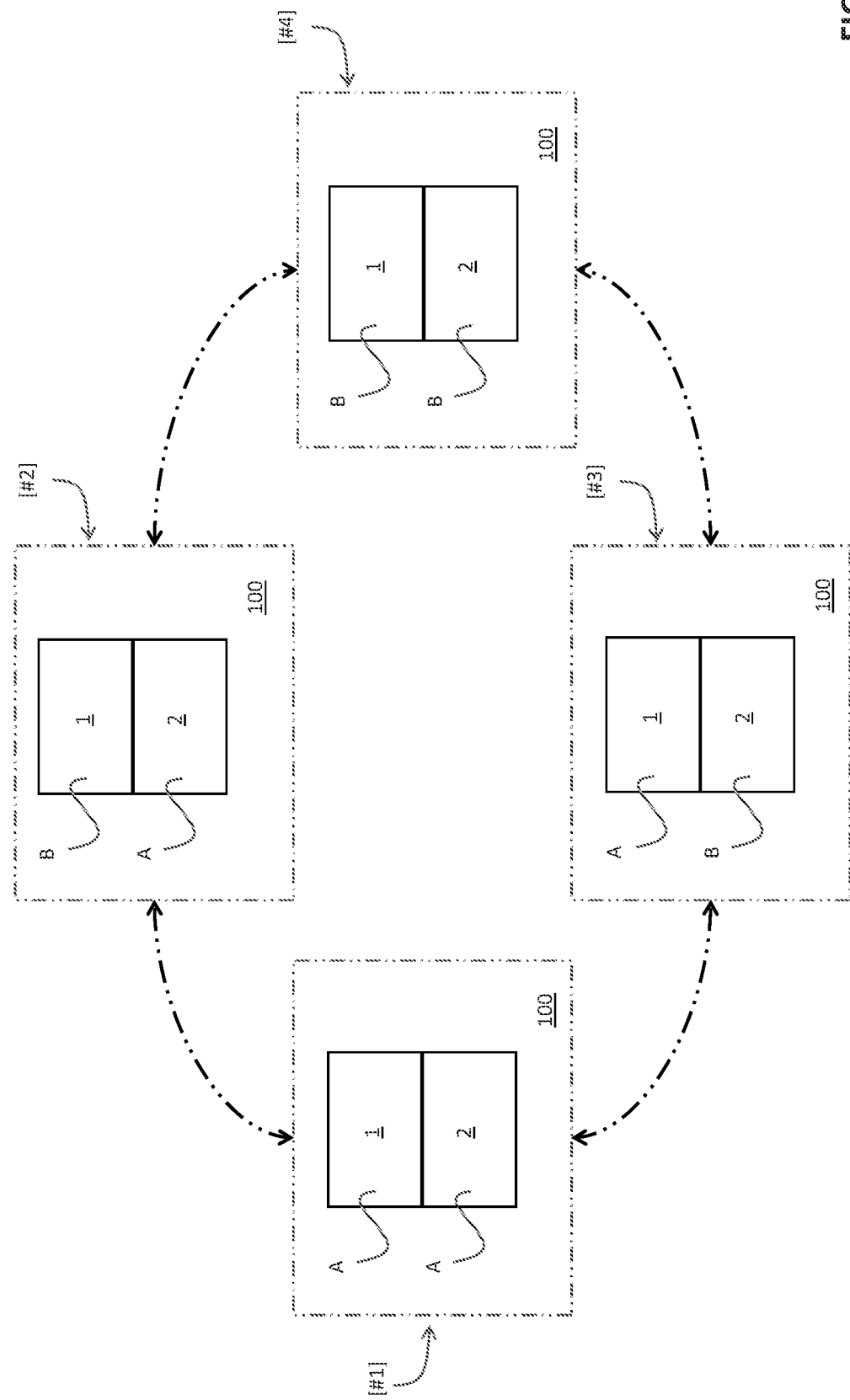
FIGS. 2-6 schematically show the operation of the switching apparatus, according to the invention.

FIG. 2 schematically represents the operating configurations that can be taken by the switching apparatus 100 when withdrawal and insertion manoeuvres of the switching units 1, 2 are carried out.

According to the configuration #1, both the switching units 1, 2 are in insertion condition.

According to the configuration #2, the switching unit 1 is in a withdrawal condition B while the switching unit 2 is in an insertion condition A. In this case, the switching unit 1 may be in a test position or in a fully withdrawn position, according to the needs.

In order to pass from the configuration #1 to the configuration #2 of the switching apparatus, a withdrawal manoeuvre of the sole first switching unit 1 has to be carried out. In order to pass from the configuration #2 to the configuration #1 of the switching apparatus, an insertion manoeuvre of the sole first switching unit 1 has to be been carried out.

According to the configuration #3, the first switching unit 1 is in an insertion condition A while the second switching unit 2 is in a withdrawal condition B. In this case, the second switching unit 2 may be in a test position or in a fully withdrawn position, according to the needs.

In order to pass from the configuration #1 to the configuration #3 of the switching apparatus, a withdrawal manoeuvre of the sole second switching unit 2 has to be carried out. In order to pass from the configuration #3 to the configuration #1 of the switching apparatus, an insertion manoeuvre of the sole second switching unit 2 has to be carried out.

According to the configuration #4, both the switching units 1, 2 are in a withdrawal condition. In this case, each of the switching units 1, 2 may be in a test position or in a fully withdrawn position, according to the needs.

In order to pass from the configuration #2 to the configuration #4 of the switching apparatus, a withdrawal manoeuvre of the sole second switching unit 2 has to be carried out. In order to pass from the configuration #4 to the configuration #2 of the switching apparatus, an insertion manoeuvre of the sole second switching unit 2 has to be carried out.

In order to pass from the configuration #3 to the configuration #4 of the switching apparatus, a withdrawal manoeuvre of the sole first switching unit 1 has to be carried out. In order to pass from the configuration #4 to the configuration #3 of the switching apparatus, an insertion manoeuvre of the sole first switching unit 1 has to be been carried out.

In principle, the switching apparatus 100 may take any of the above-mentioned configurations according to the needs. However, the withdrawal manoeuvres of the switching units 1, 2 can be carried out only if these latter are in certain operating conditions. In particular, a withdrawal manoeuvre of each switching unit 1, 2 can be carried out only if said switching unit is in an open condition OFF.

In general, the switching units 1 and 2 may include a number of additional components arranged at industrial level according to solutions of known type. Hereinafter, they will be not described in further structural details, for the sake of brevity.

According to the invention, the switching apparatus 100 comprises a controller 3 adapted to control the operation of switching apparatus 100, in particular of the switching units 1, 2.

According to some embodiments of the invention (FIG. 1), the controller 3 is a self-standing device, which is not enclosed in anyone of the switching units 1, 2.

According to other embodiments of the invention (not shown), the controller 3 is enclosed in one of the switching units 1 and 2, preferably in the first switching unit 1.

Preferably, the controller 3 comprises a data processing section 31 adapted to process and provide data or control signals to implement the requested functionalities. In general, the data processing section 31 may include data processing resources of digital or analog type, e.g. one or more microprocessors or DSPs.

Preferably, the controller 3 comprises a trip section 32 adapted to interact with the data processing section 31 in order to generate the trip signals T1, T2 for controlling the operation of the switching units 1, 2. In general, the trip section 32 may include data processing resources of digital or analog type, e.g. one or more microprocessors or DSPs.

Preferably, the controller 3 is adapted to receive and process input commands CM1, CM2, CM3 (e.g. formed by suitable control signals) indicative of a desired operating state for the switching apparatus 100 in order to control the operation of the switching units 1, 2.

Preferably, the controller 3 comprises an interface section 33 including one or more input ports adapted to receive the input commands CM1, CM2, CM3.

Preferably, the switching apparatus 100 comprises a human-machine interface 5 in communication with the interface section 33 of the controller 3. The human-machine interface 5 is adapted to provide the input commands CM1, CM2, CM3 upon interaction with a user.

According to other embodiments of the invention (not shown), the human-machine interface 5 is enclosed in one of the switching units 1 and 2, preferably in the first switching unit 1.

According to some embodiments of the invention, the interface section 33 of the controller 3 is adapted to communicate with a remote computerized device 99 (which in general is not part of the switching apparatus 100), e.g. a digital relay. Conveniently, the interface section 33 may receive the input commands CM1, CM2, CM3 from the computerized device 99.

In general, the controller 3 and the human-machine interface 5 may be arranged at industrial level according to hardware solutions of known type. Thus, hereinafter, they will be not described in further structural or circuit details, for the sake of brevity.

In the switching apparatus 100, the closing or opening manoeuvres of each switching unit are generally carried out depending on the desired operating state for the switching apparatus 100.

The controller 3 is thus conveniently configured to command the execution of an opening or closing manoeuvre of each switching unit 1, 2 by generating the above-mentioned trip signals T1, T2 in response to receiving the above-mentioned input commands CM1, CM2, CM3.

In principle, also the withdrawal and insertion manoeuvres of the switching units 100 may be carried out according to the needs. However, as mentioned above, the withdrawal manoeuvres of each switching unit 1, 2 can be carried out, upon activation by a user, only if said switching unit is in an open condition OFF.

Preferably, the controller 3 is configured to prevent the first actuating arrangement 7 (through suitable enabling means—not shown) from moving the first switching unit 1 from an insertion condition A to a withdrawal condition B, if the switching unit 1 is in a closed condition ON. The controller 3 thus enables the first actuating arrangement 7 to move the first switching unit 1 from an insertion condition A to a withdrawal condition B only if this switching unit is in an open condition OFF.

Preferably, the controller 3 is configured to prevent the first actuating arrangement 7 from moving the first switching unit 1 from an insertion condition A to a withdrawal condition B also if the second switching unit 2 is in a closed condition ON. In this case, the controller 3 enables the first actuating arrangement 7 to move the first switching unit 1 from an insertion condition A to a withdrawal condition B only if both the switching units 1, 2 are in an open condition OFF.

This solution allows preventing withdrawal manoeuvres of the first switching unit 1, when leakage currents are still circulating along the electric poles of the switching units due to the fact that the second switching unit 2 is in a closed condition ON. In this way, it is possible to avoid discharging phenomena at the pole contacts 11, 12 of the first switching unit (due to the breaking of leakage currents), which may quite dangerous to personnel operating on the field.

Preferably, the second actuating arrangement 8 is adapted to move the second switching unit 2 from an insertion condition A to a withdrawal condition B, only if the second switching unit 2 is in an open condition OFF.

Conveniently, the second actuating arranging 8 incorporates suitable enabling means (not shown) that prevent the execution of a withdrawal manoeuvre of the second switching unit 2, if this latter is in a closed condition ON.

According to the invention, the switching apparatus 100 comprises a power supply stage 4 adapted to receive an external auxiliary power supply $V_{AUX}$ to be used for feeding internal (electric or electronic) low-voltage components of the switching apparatus, such as the controller 3, the contact actuators 25, the actuating arrangements 7, 8 and the above-mentioned driving circuits included in the switching units 1, 2.

In general, the external auxiliary power supply $V_{AUX}$ is derived from the electric line 50 through a suitable auxiliary power interface device (not shown) or it can be provided by any external power source.

When it is present, such an auxiliary power interface device (generally not included in the switching apparatus) may be of known type and it will be here not described for the sake of brevity.

Preferably, the power supply stage 4 comprises one or more driving circuits adapted to receive an external power supply voltage $V_{AUX}$ and provide a charging current $I_C$ to be used for charging suitable energy storage means.

According to the invention, the switching apparatus 100 comprises an energy storage stage 9 electrically connected with the power supply stage 4, so as to receive a charging current $I_C$ from this latter.

Preferably, the energy storage stage 9 includes rechargeable storage means (e.g. a capacitor bank or a battery) for storing electric energy and suitable interface circuits capable of providing suitable power supply voltages Vs to the low-voltage internal components of the switching apparatus by drawing electric energy from the above-mentioned storage means.

Preferably, the power supply stage 4 and the energy storage stage 9 are accommodated in the fixed section of the switching apparatus According to some embodiments of the invention, the power supply stage 4 and the energy storage stage 9 may be self-standing devices.

Preferably, the power supply stage 4 and the energy storage stage 9 may be integrated to form a single circuit structure.

In general, the power supply stage 4 and the energy storage stage 9 may be arranged at industrial level according to solutions of known type. Thus, hereinafter, they will be not described in further structural or circuit details, for the sake of brevity.

According to an important aspect of the invention, the controller 3 is configured to control the first and second switching units 1, 2, so that both said switching units are in an open condition, when the power supply stage 4 is subject to a fault condition.

For the sake of clarity, it is specified that the power supply stage 4 is subject to a "fault condition" when it cannot properly operate, for example when it cannot receive the external auxiliary power supply $V_{AUX}$ for any reason.

In practice, a fault condition of the power supply stage 4 corresponds to an inability of the switching apparatus of receiving or exploiting an external auxiliary power supply to feed its low-voltage internal components.

Preferably, the controller 3 is configured to command both the first switching unit 1 and the second switching unit 2 to switch to or remain in an open condition, in response to receiving sensing signals S2 indicative of a fault condition of the power supply stage 4.

Preferably, the switching apparatus 100 comprises power supply sensing means 6 adapted to provide sensing signals S2 indicative of the operating conditions of the power supply stage 4 to the controller 3. As an example, the sensing means 6 may comprise one or more voltage sensors or current sensors (which may be of the known type) adapted to signal a fault condition to the controller 3, for example a fault condition in which the external auxiliary power supply $V_{AUX}$ is no more available for any reason.

It is evidenced that both the switching units 1, 2 can use the energy stored in the energy storage means 9 in order to carry out the opening manoeuvres commanded by the controller 3 in response to a fault condition of the power supply stage 4.

In this way, the switching apparatus 100 can be brought in safe conditions (with both the switching units 1, 2 in an open condition) before said switching units cannot operate anymore as the low-voltage internal components of the switching apparatus (in particular the controller 3, the contact actuators 25 and the above-mentioned driving circuits) are not fed.

Thanks to the solution provided by the invention, the switching apparatus ensure s higher safety levels in operation. Withdrawal manoeuvres of the first switching unit 1 in presence of leakage currents are prevented even when the power supply stage 4 is subject to a fault condition and the switching units 1, 2 might not be able to operate (in order to carry out their opening manoeuvres) in a short time.

According to a further aspect of the invention, the controller 3 is configured to implement a special control logic to control the operation of the switching apparatus 100 by controlling the operation of the switching units 1, 2.

Figure 3:
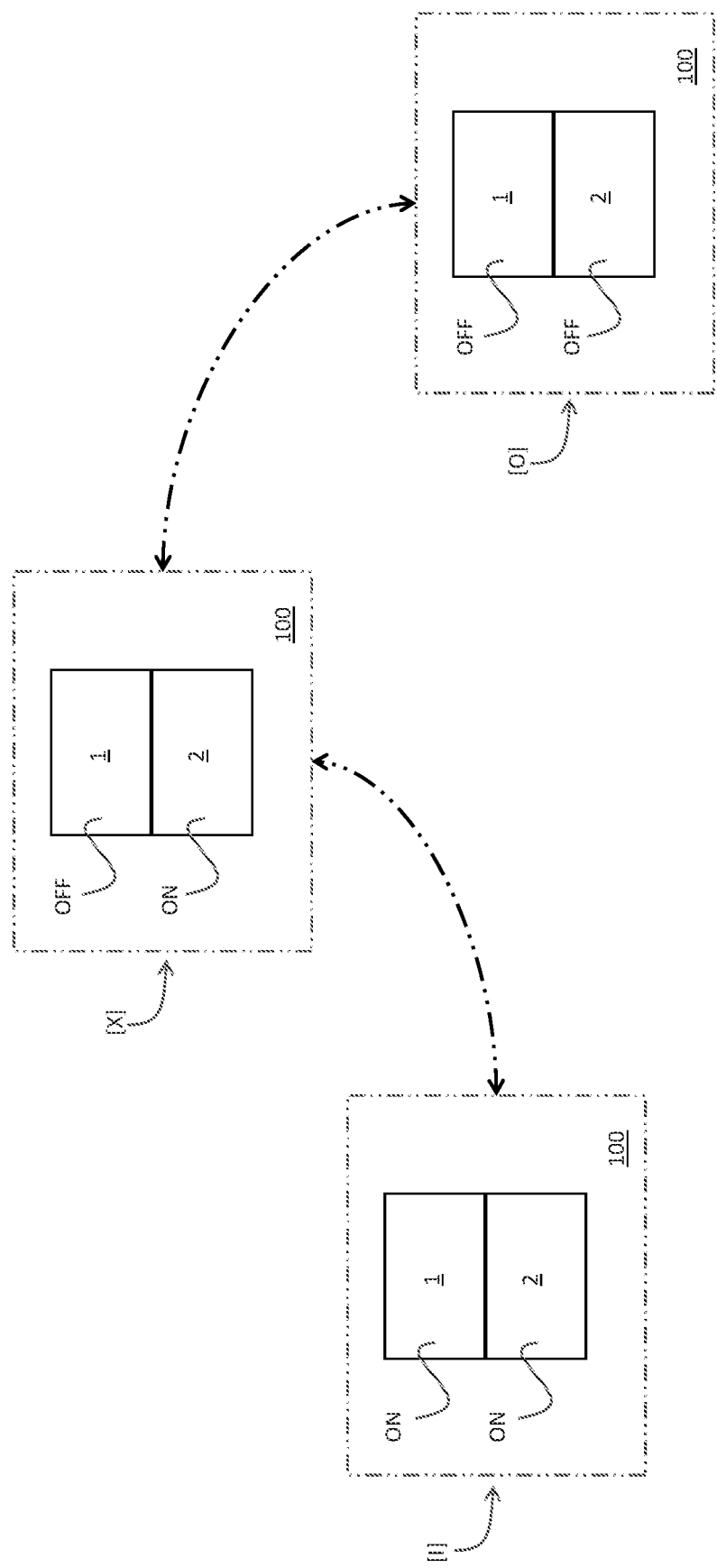

According to such a control logic, when they are in an insertion condition A, the first and second switching units 1, 2 may take in combination only specific operating configurations, each configuration corresponding to a predefined given operating state of the switching apparatus 100 (FIG. 3).

Preferably, the controller 3 is configured to control the switching units 1, 2 in such a way that these latter can operate in combination, according to the following operating configurations only:
 a first operating configuration [I], in which both the switching units 1, 2 are in a closed condition ON; or
 a second operating configuration [X], in which the first switching unit 1 is in an open condition OFF and the second switching unit 2 is in a closed condition ON; or
 a third operating configuration [O], in which both the switching units 1, 2 are in an open condition OFF.

When the switching units 1, 2 operate according to the first operating configuration [I], line currents are allowed to flow through the electric poles 1A, 2A of the switching units 1, 2. Thus, there is an electrical continuity between the first and second line conductors 51, 52 of the electric line 50. The first operating configuration [I] of the switching units 1, 2 therefore corresponds to a closed state of the switching apparatus 100.

When the switching units 1, 2 operate according to the second operating configuration [X], line currents are not allowed to flow along the electric poles 1A, 2A of the switching units 1, 2 as the first switching unit 1 is in an open condition OFF. The first and second line conductors 51, 52 of the electric line 50 are thus disconnected. However, there is no galvanic insulation between the line conductors 51, 52 as the second switching unit 2 is in a closed condition ON and leakage currents affecting the solid-state switches 10 can still flow along the electric poles 1A, 2A. The second operating configuration [X] of the switching units 1, 2 corresponds to a stand-by state of the switching apparatus 100, which is intermediate between a closed state and an open state.

When the switching units 1, 2 operate according to the third operating configuration [O], line currents and possible leakage currents are not allowed to flow along the electric poles 1A, 2A of the switching units 1, 2 as the both the switching units 1 are in an open condition OFF. The first and second line conductors 51, 52 of the electric line 50 are disconnected and there is a galvanic insulation between said line conductors. The third operating configuration [O] of the switching units 1, 2 therefore corresponds to an open state of the switching apparatus 100.

In general, the controller 3 is configured to command the switching units 1, 2 to switch from one operating configuration to another in response to receiving the above-mentioned input commands CM1, CM2, CM3 indicative of a desired operating state for the switching apparatus 100.

However, according the control logic implemented by the controller 3, any transition between the operating configurations of the switching units 1, 2 has always to involve the second operating configuration [X], which corresponds to a stand-by state of the switching apparatus 100 (FIG. 3).

In other words, the controller 3 is configured to control the switching units 1, 2 in such a way to prevent any direct transition between the first operating configuration [I] and the third configuration [O] of the switching units 1, 2 (FIG. 3).

Preferably, when the switching units 1, 2 are in the first operating configuration [I] (corresponding to a closed state of the switching apparatus 100), the controller 3 can command the switching units 1, 2 to switch in the second operating configuration [X] (corresponding to a stand-by state of the switching apparatus 100).

In practice, according to the control logic implemented by the controller 3, the switching units 1, 2 can switch from the first operating configuration [I] in another operating configuration only passing through the second operating configuration [X].

When it is in a closed state (first operating configuration [I] of the switching units 1, 2) the switching apparatus 100 can switch in another operating state only passing through the stand-by state (second operating configuration [X] of the switching units 1, 2).

Preferably, when the switching units 1, 2 are in the second operating configuration [X] (corresponding to a stand-by state of the switching apparatus 100), the controller 3 can command the switching units 1, 2 to switch in the first operating configuration [I] (corresponding to a closed state of the switching apparatus 100) or to switch in the third operating configuration [O] (corresponding to an open state of the switching apparatus 100).

In practice, according to the control logic implemented by the controller 3, the switching units 1, 2 can switch from the second operating configuration [X] either in the first operating configuration [I] or in the third operating configuration [O].

When it is in a stand-by state (second operating configuration [X] of the switching units 1, 2), the switching apparatus 100 can switch either in an closed state (first operating configuration [I] of the switching units 1, 2) or in an open state (third operating configuration [O] of the switching units 1, 2).

Preferably, when the switching units 1, 2 are in the third operating configuration [O] (corresponding to an open state of the switching apparatus 100), the controller 3 can command the switching units 1, 2 to switch in the second operating configuration [X] (corresponding to a stand-by state of the switching apparatus 100).

In practice, according to the control logic implemented by the controller 3, the switching units 1, 2 can switch from the third operating configuration [O] in another operating configuration only passing through the second operating configuration [X].

When it is in an open state (third operating configuration [O] of the switching units 1, 2), in response to receiving an input command CM1, CM2 indicative of a desired different operating state, the switching apparatus 100 can switch in another operating state only passing through the stand-by state (second operating configuration [X] of the switching unit 1, 2).

The above-mentioned control logic is configured so that the withdrawal manoeuvres of each switching unit 1, 2 can be carried out, upon activation by a user, only if said switching unit is in an open condition OFF.

Preferably, the controller 3 is configured to prevent a withdrawal manoeuvre of the first switching unit 1 (by disabling the first actuating arrangement 7 as mentioned above), if the first and second switching units 1, 2 operate in combination according to the first operating configuration [I].

Preferably, the controller 3 is configured to prevent a withdrawal manoeuvre of the first switching unit 1 also if the second switching unit 2 is in a closed condition ON. In this case, the controller 3 is configured to prevent a withdrawal manoeuvre of the first switching unit 1, also if the first and second switching units 1, 2 operate in combination according to the second operating configuration [X] and it is configured to enable a withdrawal manoeuvre of the first switching unit 1, only if the first and second switching units 1, 2 operate in combination according to the third operating configuration [O].

Preferably, the second actuating arrangement 8 is adapted to carry out a withdrawal manoeuvre of the second switching units 2, only if the second switching unit 2 is in an open condition OFF. In this case, the controller 3 is configured to enable a withdrawal manoeuvre of the first switching unit 1, only if the first and second switching units 1, 2 operate in combination according to the third operating configuration [O].

Conveniently, the above-mentioned control logic is designed to take into consideration a possible fault condition of the power supply stage 4.

Preferably, the controller 3 is configured to control the first and second switching units 1-2, so that the first and second switching units are in the above-mentioned third operating configuration [O], when the power supply stage 4 is subject to a fault condition.

In particular, the controller 3 is configured to command the first switching unit 1 and the second switching unit 2 to switch to or remain in the third operating configuration [O], in response to receiving sensing signals S2 indicative of a fault condition of the power supply stage 4.

Figure 4:
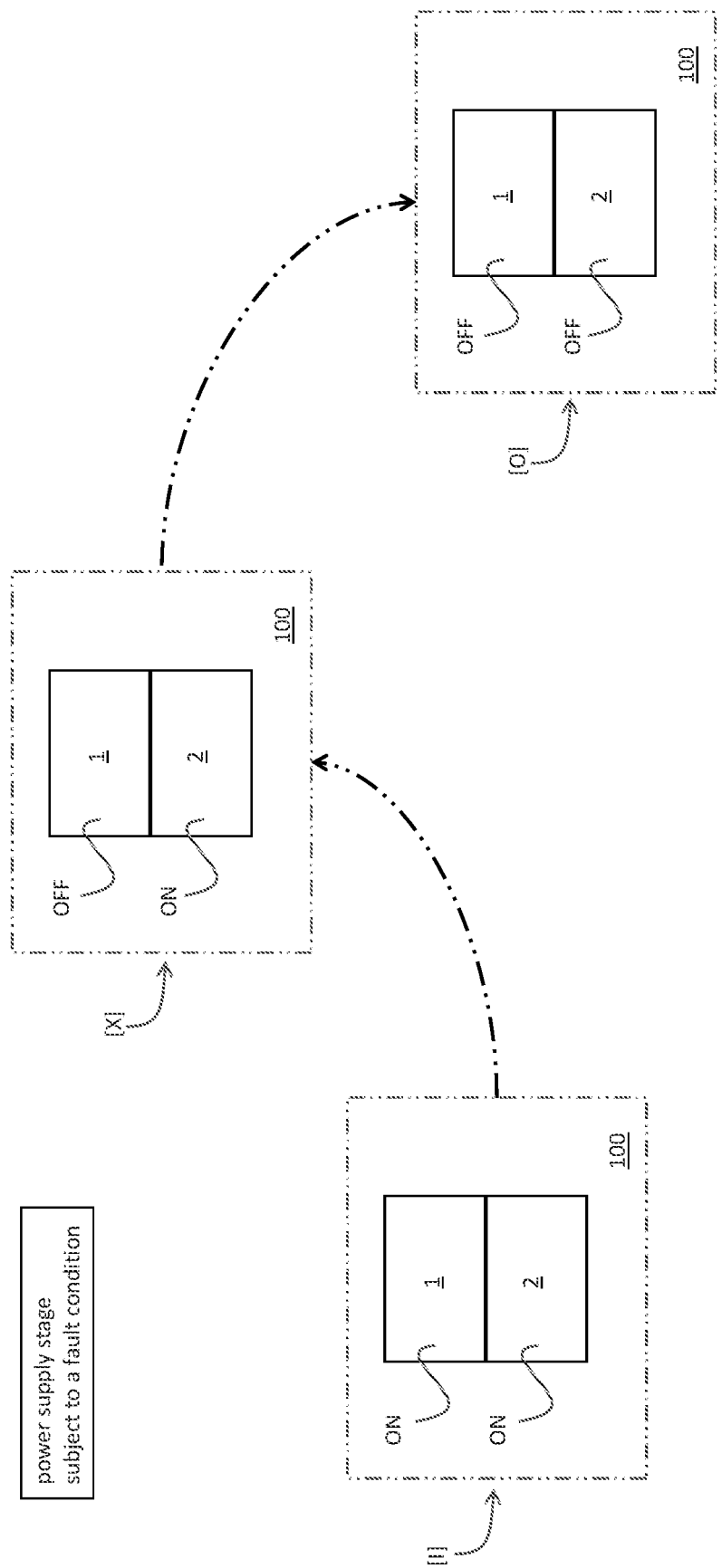

Preferably, when the first and second switching units 1, 2 operate in combination according to the above-mentioned first operating configuration [I], the controller 3 commands said switching units to switch to the second operating configuration [X] and subsequently to switch to the third operating configuration [O] in response to receiving sensing signals S2 indicative of a fault condition of the power supply stage 4 (FIG. 4).

When it is in a closed state (first operating configuration [I] of the switching units 1, 2), the switching apparatus 100 automatically switches to a stand-by state (second operating configuration [X] of the switching units 1, 2) and subsequently to an open state (third operating configuration [O] of the switching units 1, 2) in response to a fault condition of the power supply stage 4.

Figure 5:
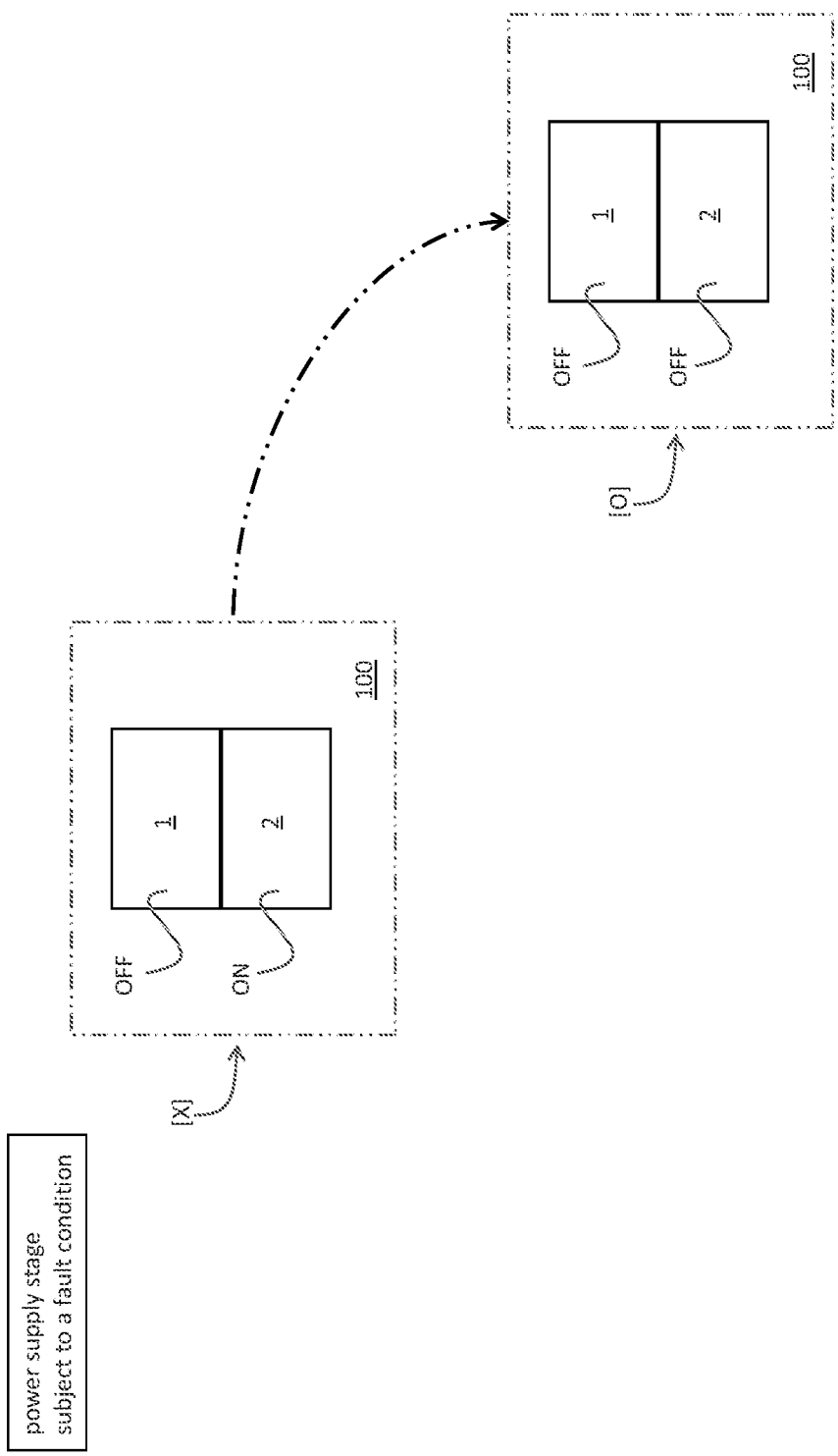

Preferably, when the first and second switching units 1, 2 operate in combination according to the above-mentioned second operating configuration [X], the controller 3 commands said switching units 1, 2 to switch to said third operating configuration [O] in response to receiving sensing signals S2 indicative of a fault condition of the power supply stage 4 (FIG. 5).

When it is in a stand-by state (second operating configuration [X] of the switching units 1, 2), the switching apparatus 100 automatically to an open state (third operating configuration [O] of the switching units 1, 2) in response to a fault condition of the power supply stage 4.

Figure 6:
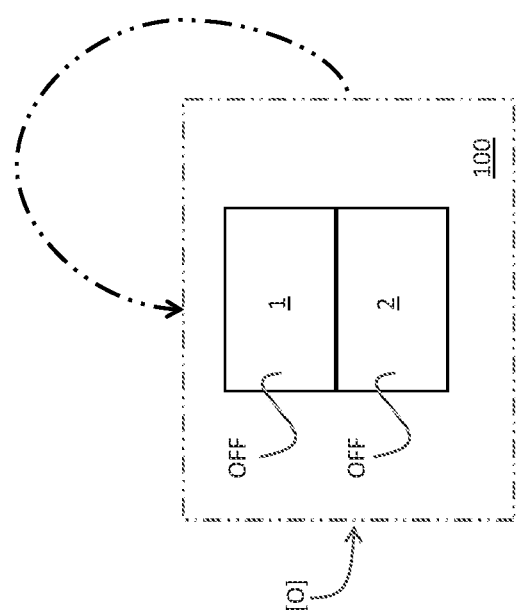

Preferably, when the first and second switching units 1, 2 operate in combination according to the above-mentioned third operating configuration [O], the controller 3 commands said switching units 1, 2 to remain in the third operating configuration [O] in response to receiving sensing signals S2 indicative of a fault condition of the power supply stage 4 (FIG. 6).

When it is in an open state (third operating configuration [O] of the switching units 1, 2), the switching apparatus 100 cannot switch in a different state (e.g. a stand-by state or a closed state) due to a fault condition of the power supply stage 4.

It is evident from the above that, according to the above-mentioned control logic, the switching apparatus 100 is automatically brought in safe condition (with both the switching units 1, 2 in an open condition) in response to a fault condition of the power supply stage 4. Also in this case, both the switching units 1, 2 can use the energy stored in the energy storage means 9 to carry out the opening manoeuvres commanded by the controller 3.

The switching apparatus 100 of the invention provides relevant advantages with respect to available corresponding solutions of the state of the art.

Differently from the known solutions of the state of the art, the controller 3 of the switching apparatus 100 is configured to carry out an emergency control action in response to a fault condition of the power supply stage 4.

Such an emergency control action consists in commanding the SSCB switching unit 1 and the electro-mechanical unit 2 to switch to or remain in an open state when an external auxiliary power supply is no more available for any reason.

This solution prevents from carrying out a withdrawal manoeuvre of the first switching unit 1 in presence of leakage currents, which might still circulate if the second switching unit 2 was in a closed condition ON.

The switching apparatus 100 thus operates safely even when the internal low-voltage components of the switching apparatus cannot be fed anymore as in normal conditions. The electric energy stored in the energy storage stage 9 is, in fact, primarily used to bring the switching apparatus in safe conditions (open state of both the switching units 1, 2).

According to an aspect the invention, the controller 3 of the switching apparatus is configured to control the switching units 1, 2 in such a way that the switching apparatus 100 can take a stand-by state (second configuration [X] of the switching units 1, 2) in addition to a closing state (first configuration [I] of the switching units 1, 2) and an open state (third configuration [O] of the switching units 1, 2).

Such a solution allows relaxing time synchronization constraints between the switching units 1, 2 when the switching apparatus 100 has to carry out an opening manoeuvre (i.e. a transition from a closed state to an open state) or a closing manoeuvre (i.e. a transition from an open state to a closed state).

Also such a control logic provides for bringing the switching apparatus in a safe condition (third configuration [O] of the switching units 1, 2) in response to a fault event in the power supply stage 4.

The switching apparatus 100 can thus operate according to a robust control logic, which allows improving its overall efficiency and safety.

The switching apparatus 100 is relatively easy to produce at industrial levels and it can be manufactured at competitive costs with respect to similar installations of the state of the art.

The invention claimed is:

1. A switching apparatus for electric power distribution grids comprising:
one or more first and second line terminals electrically connectable to corresponding first and second line conductors of an electric line, respectively;
a first switching unit having one or more first electric poles, each first electric pole comprising a first pole contact electrically connectable to a corresponding first line terminals, a second pole contact and one or more solid-state switches electrically connected to said first and second pole contacts and adapted to operate in a conduction state or in an interdiction state to allow or interrupt a current flow,
wherein said first switching unit is reversibly switchable between a closed condition, in which said solid-state switches are in a conduction state, and an open condition, in which said solid-state switches are in an interdiction state, and
wherein said first switching unit is reversibly movable between an insertion condition, in which said first pole contacts are coupled with said first line terminals, and a withdrawal condition, in which said first pole contacts are uncoupled from said first line terminals;
a second switching unit having one or more second electric poles, each second electric pole comprising a third pole contact electrically connectable to a corresponding second pole contact of the first switching unit, a fourth pole contact electrically connectable to a corresponding second line terminal and electric contacts electrically connected to said third and fourth pole contacts and adapted to operate in a coupled state or on an uncoupled state to allow or interrupt a current flow,
wherein said second switching unit is reversibly switchable between a closed condition, in which said electric contacts are in a coupled state, and an open condition, in which said electric contacts are in an uncoupled state, and wherein said second switching unit is reversibly movable between an insertion condition, in which said fourth pole contacts are coupled with said second line terminals, and a withdrawal condition, in which said fourth pole contacts are uncoupled from said second line terminals;

a controller adapted to control an operation of said switching apparatus; and a power supply stage adapted to receive an external power supply, wherein said controller is configured to control said first and second switching units, so that both said first and second switching units are in an open condition, when said power supply stage is subject to a fault condition.

2. The switching apparatus, according to claim 1, wherein said controller is configured to command said first switching unit and said second switching unit to switch to or remain in an open condition, in response to receiving sensing signals indicative of a fault condition of said power supply stage.

3. The switching apparatus, according to claim 2, further comprising a power supply sensing means adapted to provide sensing signals indicative of operating conditions of said power supply stage to said controller.

4. The switching apparatus, according to claim 3, wherein said controller is configured to control said first and second switching units, so that said first and second switching units operate in combination according to the following operating configurations:

a first operating configuration corresponding to a closed state of said switching apparatus, in which both said first and second switching units are in a closed condition; or a second operating configuration corresponding to a stand-by state of said switching apparatus, in which said first switching unit is in an open condition and said second switching unit is in a closed condition; or a third operating configuration corresponding to an open state of said switching apparatus, in which both said first and second switching units are in an open condition, wherein said controller is configured to control said first and second switching units, so that said first and second switching units are in said third operating configuration, when said power supply stage is subject to a fault condition.

5. The switching apparatus, according to claim 4, wherein said controller is configured to command said first switching unit and said second switching unit to switch to or remain in said third operating configuration, in response to receiving sensing signals indicative of a fault condition of said power supply stage.

6. The switching apparatus, according to claim 5, wherein when said first and second switching units operate in combination according to said first operating configuration, said controller commands said first and second switching units to switch to said second operating configuration and subsequently to switch to said third operating configuration in response to receiving sensing signals indicative of a fault condition of said power supply stage.

7. The switching apparatus, according to claim 6, further comprising a first actuating arrangement adapted to actuate said first switching unit at least during a withdrawal maneuver of said first switching unit, upon activation by a user.

8. The switching apparatus, according to claim 7, further comprising a second actuating arrangement adapted to actuate said second switching unit at least during a withdrawal maneuver of said second switching unit, upon activation by a user.

9. The switching apparatus, according to claim 5, wherein when said first and second switching units operate in combination according to said second operating configuration, said controller commands said first and second switching units to switch to said third operating configuration in response to receiving sensing signals indicative of a fault condition of said power supply stage.

10. The switching apparatus, according to claim 9, wherein when said first and second switching units operate in combination according to said third operating configuration, said controller commands said first and second switching units to remain in said third operating configuration in response to receiving sensing signals indicative of a fault condition of said power supply stage.

11. The switching apparatus, according to claim 5, wherein when said first and second switching units operate in combination according to said third operating configuration, said controller commands said first and second switching units to remain in said third operating configuration in response to receiving sensing signals indicative of a fault condition of said power supply stage.

12. The switching apparatus, according to claim 1, further comprising a first actuating arrangement adapted to actuate said first switching unit at least during a withdrawal maneuver of said first switching unit, upon activation by a user.

13. The switching apparatus, according to claim 1, further comprising a second actuating arrangement adapted to actuate said second switching unit at least during a withdrawal maneuver of said second switching unit, upon activation by a user.

14. The switching apparatus, according to claim 1, wherein said controller comprises an interface section including one or more input ports adapted to receive input commands indicative of a desired operating state for said switching apparatus.

15. The switching apparatus, according to claim 14, further comprising a human-machine interface in communication with said interface section, said human-machine interface being adapted to provide said input commands upon an interaction with a user.

16. The switching apparatus, according to claim 15, wherein said interface section is capable of receiving said input commands from a remote computerized device.

17. The switching apparatus, according to claim 14, wherein said interface section is capable of receiving said input commands from a remote computerized device.

18. The switching apparatus, according to claim 1, wherein said controller is included in said first switching unit.

19. The switching apparatus, according to claim 1, further comprising a power supply sensing means adapted to provide sensing signals indicative of operating conditions of said power supply stage to said controller.

* * * * *